(12) United States Patent
Pietsch (10) Patent No.: US 8,141,698 B2
(45) Date of Patent: Mar. 27, 2012

(54) COUPLING ARRANGEMENT AND SYSTEM FOR CONTINUOUS HAULAGE CONVEYOR

(76) Inventor: Michael Pietsch, Winthrop (AU)

( * ) Notice: Subject to any disclaimer, the term of this patent is extended or adjusted under 35 U.S.C. 154(b) by 111 days.

(21) Appl. No.: 12/296,322

(22) PCT Filed: Apr. 5, 2007

(86) PCT No.: PCT/AU2007/000467
§ 371 (c)(1),
(2), (4) Date: Dec. 12, 2008

(87) PCT Pub. No.: WO2007/115369
PCT Pub. Date: Oct. 18, 2007

(65) Prior Publication Data
US 2009/0283387 A1    Nov. 19, 2009

(30) Foreign Application Priority Data
Apr. 7, 2006    (AU) .................. 2006901812

(51) Int. Cl.
*B65G 17/00* (2006.01)
(52) U.S. Cl. ............ 198/844.2; 198/819; 198/823
(58) Field of Classification Search ........... 198/844.2, 198/819, 823
See application file for complete search history.

(56) References Cited

U.S. PATENT DOCUMENTS

| | | | | |
|---|---|---|---|---|
| 3,414,123 | A * | 12/1968 | Litt et al. ................ | 206/486 |
| 4,170,281 | A * | 10/1979 | Lapeyre ................. | 198/844.2 |
| 4,427,107 | A * | 1/1984 | Roberts et al. ......... | 198/844.2 |
| 4,915,213 | A | 4/1990 | Loodberg et al. | |
| 5,038,442 | A | 8/1991 | Stolz et al. | |
| 5,083,658 | A | 1/1992 | Siwersson et al. | |
| 5,246,100 | A * | 9/1993 | Stone et al. ............. | 198/844.2 |
| 5,246,102 | A * | 9/1993 | Rappen et al. .......... | 198/860.2 |
| 5,327,823 | A * | 7/1994 | Clevenger et al. ..... | 100/88 |
| 5,467,867 | A * | 11/1995 | Musil et al. ............ | 198/844.2 |
| 5,645,158 | A * | 7/1997 | Polka et al. ............ | 198/812 |
| 5,669,114 | A * | 9/1997 | Jakob .................... | 24/33 P |
| 6,036,000 | A * | 3/2000 | Loodberg ............... | 198/819 |
| 6,238,131 | B1 * | 5/2001 | Watts et al. ............ | 403/337 |
| 6,321,903 | B1 * | 11/2001 | Shaffer .................. | 198/844.2 |
| 6,601,698 | B2 * | 8/2003 | Jakob .................... | 198/844.2 |

(Continued)

FOREIGN PATENT DOCUMENTS

AU    55345/94    5/1995

(Continued)

OTHER PUBLICATIONS

Examination report dated Mar. 30, 2010 in corresponding New Zealand Application No. 572596.

(Continued)

*Primary Examiner* — Joseph A Dillon, Jr.
(74) *Attorney, Agent, or Firm* — Faegre Baker Daniels LLP (57) ABSTRACT

A connector, and coupling system, for portions of a belt for a conveyor system. A connector (10),(60) has inter-cooperating releasable coupling portions (11),(12),(61),(62). These can be provided at respective ends of edge portions of a conveyor belt to be coupled. The releasable coupling portion (male/female) of one belt portion is arranged to releasably couple to the corresponding respective coupling portion (female/male) for the end of a second belt portion. The connector system permits discrete sections of conveyor belt to be removed and replaced for maintenance or repair, or one or more belt sections to be removed or inserted to shorten or lengthen the belt as required.

18 Claims, 7 Drawing Sheets

U.S. PATENT DOCUMENTS

| | | |
|---|---|---|
| 6,687,961 B2 | 2/2004 | Miller et al. |
| 7,032,744 B1 * | 4/2006 | Pietsch .................. 198/819 |
| 7,222,729 B1 * | 5/2007 | Travis .................. 198/844.2 |
| 7,344,020 B2 * | 3/2008 | Grywacheski et al. .... 198/844.2 |
| 7,594,574 B2 * | 9/2009 | Mol et al. ............... 198/844.2 |
| 7,661,256 B2 * | 2/2010 | Coers et al. ................. 56/181 |
| 7,779,995 B2 * | 8/2010 | Lechner et al. ........... 198/844.2 |

FOREIGN PATENT DOCUMENTS

| | | |
|---|---|---|
| AU | 767395 | 10/2008 |
| FR | 1.496.897 | 10/1967 |
| FR | 2 599 724 | 12/1987 |
| FR | 2 630 411 | 10/1989 |
| GB | 1 351 132 | 4/1974 |
| GB | 2 145 683 | 4/1985 |
| JP | 2005-15213 | 1/2005 |
| RU | 1795952 | 2/1993 |

OTHER PUBLICATIONS (*) = Foreign patent document together with English language abstract.

* cited by examiner

COUPLING ARRANGEMENT AND SYSTEM FOR CONTINUOUS HAULAGE CONVEYOR

TECHNICAL FIELD

The present invention relates to continuous haulage systems, such as suspended continuous haulage systems for conveying bulk materials like iron ore and coal.

BACKGROUND

Run of Mine (ROM) material is defined as any free material from a mine, including both ore and waste material. In the economic analysis of the viability of a mine, a vital consideration lies in the assessment of the cost of transporting (ROM) material following extraction.

Typically, the material is removed by purpose built trucks, capable of transporting many tens of tonnes of material at a time. The ROM material is loaded onto the trucks, either from temporary stockpiles or directly from extraction. The trucks then travel from the pit to the waste material dump or to the ore crushing plant, depending on the quality of material for the particular load.

The purchase of a fleet of appropriate trucks involves a considerable capital cost, as does the establishment and maintenance of roads of sufficient bearing capacity to bear the load of heavily laden trucks. Further, as the mining process progresses, the extraction point moves deeper, the path to be followed by the trucks lengthens. For a typical road grade of 10%, this means for every meter of depth, an extra 10 meters of road is required. Consequently, the cycle time for the trucks to retrieve material, dump it and return, increases. It follows, therefore, that there will be an ever increasing unit cost of ROM material over time, as the mine progresses. This variable cost, combined with the substantial amortized capital cost, have an enormous detrimental effect on the viability of mining operations.

As an alternative method, it is known to adopt conveyor systems to remove this material. Conventional conveyor systems are characterized by reinforced rubber belts, supported beneath the belt by idlers and some form of drive system to motivate the belt. The system is in a fixed position, and must be substantially straight, having little or no ability to deviate either horizontally or vertically.

A conveyor system needs to be tensioned between drive drums, which provide the motivating drive, thus being a substantial contributor to the lack of deviation. Therefore, it is normal, for such systems, to spend a considerable amount of time selecting the path to ensure an uninterrupted straight path is achievable.

A further problem lies with the mine environment. As would be expected, there is a considerable volume of dust, mud and water, which infiltrate and generally envelope all equipment within the mine zone. The combination of these factors provide for a natural and effective lubricant. Once in contact with the belt, the drive capability of the drive drums is markedly reduced. Whilst this can be accommodated for in a horizontal orientation, when the belt is inclined, the traction force is reduced below a useful level, and drive can be substantially lost.

It also follows that, when inclined above a certain angle, the material will slide down the belt, preventing transport. Typically, such systems are restricted to about 20° from the horizontal.

A further problem is the size limitation of the system. The belt of the conveyor system is susceptible to severe damage from large, angular rocks, partly because of the punching shear force established between the sharpness of the rocks on the belt and the support from underneath, as a result of the impact of the rocks. As a consequence, such systems are associated with In-Pit Crushing plants, to reduce the size and weight of individual rocks to be transported. Typically such systems are limited to rock sizes of less than 300 mm, and thus any material to be removed from the pit must be crushed to a suitable size.

A significant problem associated with this arrangement is the cost of crushing. The establishment and operation of a crushing plant is significant, and is an operation which is, justifiably, only performed if absolutely necessary. Unfortunately, it has been shown in practice that, typically, ROM material comprises a very high percentage of material above 300 mm, up to a common maximum of 1000 mm, not withstanding extremely large "renegade" rocks of unpredictable size. Thus, this initial crushing is necessary, but based on the limitations of the conveying system rather than on a sound economic basis.

Further, because material must first be delivered to the crushing plant, normally be truck, then loaded to some type of conveyor system, the material is having to be "double handled". With every transfer of material between transport mediums representing additional cost per tonne processed, further detracting from the economic viability of such a system.

Further still, whilst the ratio of waste material to ore can vary substantially, economic forecasts for a mine's viability often rely on a ratio of 6:1, that is for every 1 tonne of ore there is 6 tonnes of waste. Using the truck based system, this waste material is taken directly to a dumping site, as crushing of such material is of no practical benefit, and represents an enormous and pointless waste of resources. However, for a conveyor system, crushing of waste material above 300 mm is essential, so that it can be transported out of the pit.

An alternative form of conveyor system is the so-called suspended belt system, as exemplified by U.S. Pat. No. 4,915,213. This system, marketed under the name SICON, includes a belt that is tear-drop shaped, and open at the top. The longitudinal edges of the belt, adjacent to each other at the top of the tear-drop shape, are mounted on continuous cables tensioned between end drums that drive the belt through friction. Material is loaded by separating the cables, allowing the belt to open. After loading, the cables are brought together, containing the material not unlike a sack. It has been found that such an arrangement cannot be used on a significant slope without slippage of material thereon.

Other similar known conveyor systems are disclosed in Australian patent application AU 55345/94 (WO 95/11848 and also as RU 2118284) and U.S. Pat. No. 5,083,658, which disclose hose or continuous (endless) conveyor systems for bulk materials. Each of these systems in particular discloses the longitudinal edges of the endless belt having thickened force absorbing edges used to support and drive the endless belt.

AU 55345/94 in particular further discloses that wear of the edges can be compensated by the 'V' edges lying deeper in the space bounded by the drive rollers, and that this compensation avoids the need to move the driving rollers closer together.

The system shown in U.S. Pat. No. 5,083,658 discusses continuous longitudinal edge force absorbing members each with a continuous central rope core. The system is intended to allow the belt to readily traverse corners. This specification takes no account of wear or damage occurring to the longitudinal edge force absorbing members or to the belt.

Another known system is disclosed in Soviet Union patent publication SU 1795952, wherein the endless belt is supported at edges thereof by bolt on support brackets. If the endless belt becomes worn or damaged, the brackets could in theory be removed and reapplied to a replacement endless belt, though the ensuing down time and loss of production would make this process inefficient and high cost. It would be more usual to replace the entire belt and brackets or cut out a section of belt and weld in a fresh section. Removing a worn or damaged section of an endless belt also requires lengthy downtime with corresponding loss and disturbance to production, with corresponding increase in costs and time.

Typically, worn or damaged endless belts are repaired by cutting out the worn or damaged section, and bonding, welding and/or bolting a replacement section into place. With endless belts utilizing continuous thickened or strengthened longitudinal edge portions, such as in U.S. Pat. No. 4,915,213 or AU 55345/94, and also those systems where such longitudinal edge portions incorporate continuous rope cores, such as in U.S. Pat. No. 5,083,658, removing a section of belt also requires the longitudinal edges of that section to be removed. Joining the replacement section to the original belt and edges can introduce inherent weaknesses into the belt system, not least because the edges are used to support the belt and load. Also, and more importantly, the edge portions take the tensile loads applied in moving the belt, and therefore require strong continuous edges. Replacement bonded or spliced joints can introduce weaknesses, with potential failure of the joint under tensile load or problems in traversing pulleys.

Another problem with known continuous haulage systems is a that each system is initially designed and constructed for a particular application or site, and they generally lack adaptability to be readily extended or change direction as the site e.g. long wall mine site, extends its workings, or for disassembly of the system for removal, such as to another site. One known system provides a conveyor belt joined by a mechanical piano type connector. Such connectors have to endure large tensile and shear forces because they bear part of the downward weight of the load, as well as tensile longitudinal forces in the direction of conveying, thereby often resulting in premature wear and failure.

Other types of belt are formed as endless belts without a specific mechanical connector. The need to extend the belt when extending the conveyor system, or failure of such belts, is usually rectified by splicing in a new section of belt to avoid the need to provide a completely new longer or repaired belt. There is a lengthy and complex procedure in rejoining the new section to the previous ends, resulting in lengthy downtime and loss of productivity.

When such connections or belts fail, it is often necessary to replace the mechanical piano type connector completely or splice in a new portion of belt.

furthermore, it is difficult to form a strong secure connection between an end of the original edge portion and an end of the new edge portion such that the joint can reliably take longitudinal forces in conveying the belt and load. This is especially the cased where the edges have a rope core, such that the rubber/polymeric edge material has to be stripped back to expose a bare section of rope core in both the old and new sections, and the two rope ends then spliced together, the rubber/polymeric edge material then needing to be replaced or bonded back over the spliced rope join.

This arrangement leads to a stiffer join which can cause problems when the belt requires flexibility to traverse horizontal or vertical return wheels, corners or pulleys. Inflexibility or long joins potentially leads to failure or more repairs.

Also, where a repair is possible, downtime in replacing the damaged or worn section and joining edge portions is both lengthy and costly.

Other known art is disclosed in Australian patent application AU 200112556 (WO 01/3603) by the present applicant, the contents of which are incorporated herein by reference.

Reference to any prior art in this specification is not, and should not be taken as, an acknowledgement or any form of admission that the prior art forms part of the common general knowledge in Australia.

SUMMARY OF THE INVENTION

With the aforementioned in view, in one aspect the present invention provides a coupling device for releasably fastening together end portions of a conveyor system.

The connector advantageously permits reliable and efficient connection/separation of conveyor sections. The connector and system is also advantageously adaptable to permit discrete sections of conveyor belt to be removed and replaced for maintenance or repair, or one or more belt sections to be removed or inserted to shorten or lengthen the belt as required.

Preferably the coupling device may be arranged to couple end portions of edge portions of the system, such as the belt.

Preferably, the coupling device may include at least first and second coupling portions, the first coupling portion being provided for a respective first said end and the second coupling portion being provided for a respective second said end, wherein the first and second coupling portions are arranged to be releasably fastened together.

Thus, advantageously, the present invention allows for releasable fastening together of longitudinally aligned end portions of the edge(s) of a belt for a conveyor system, thereby alleviating problems of separating and rejoining the edge(s) of the belt, for example, when replacing or repairing a section of belt due to damage or wear.

It will be appreciated that the belt may extend transversely i.e. the belt width, between means for suspending the belt from support and/or drive means, such as a pulley or roller drive system. Embodiments of one or more forms of the present invention may be used to connect one end of the belt to another end of the belt to thereby form and endless belt, or such forms of the present invention may be used to connect a replacement or new section of belt to other sections or a complete belt. For example, an existing belt may need extending by adding one or more belt sections, or shortening by removing one or more belt sections. Similarly, damaged or worn sections may be replaced by releasing the coupling devices employed, removing the section and replacing with a fresh section by fastening the coupling devices.

Preferably the edge parts may be longitudinal edge portions integral to or attached to the belt. More preferably the edge portions may be formed of or include hook or 'J' section means, said means preferably provided for supporting the body of the belt from a roller and/or pulley drive system. However, embodiments of the present invention envisage coupling device(s) being attached to an end portion of the belt material, either directly or indirectly.

Preferably the first or second coupling portions, and preferably both, may include means for retaining (preferably receiving and retaining) at least one tension means, such as a longitudinal strap, webbing, rope, cable, belt or combinations thereof, whereby the tension means may be utilized as the means for bearing tensile forces through the edge(s) during conveying of the belt. Thus, the tension means may assist in reducing or removing tensile forces from material of the edge(s), for example, by directly transferring such forces between the first coupling means provided at one end of a section of belt through the tension means to a respective coupling means at another end of the section of belt. It will be appreciated that sections of the belt may be releasably joined together utilizing a number of the coupling devices according to embodiments of the present invention, thereby providing an opportunity to replace individual sections of the belt or the entire belt as required.

Preferably the at least first and second coupling portions may provide corresponding male and female connectors. Such an arrangement may be particularly advantageous when replacing a section of belt and the belt section is directional, such that the male and female connectors dictate that the section must be orientated in the correct direction in order to releasably connect to corresponding respective male or female connectors of adjacent sections.

Preferably the means for retaining the tension means may be a bridge or eye forming an aperture such that the tension means may be passed through and/or attached thereto. Thus, the retaining means may be utilized to either directly or indirectly attach the tension means to the respective coupling portion. In this way, it is not necessary to rely on adhesion or bond strength between the material of the edge portions to the respective coupling portions, rather the tension means may be utilized to transfer tensile forces between coupling portions, thereby largely reducing or removing tensile forces in the edge material direction of travel of the belt. The edge material may therefore be relied upon to carry the weight of the belt and the load.

Preferably, the coupling device may include at least one additional releasable fastening means for releasably connecting together the at least first and second coupling portions. More preferably, the at least one additional releasable fastening means may be one or more screws, bolts, pins, circlips or the like, so as to advantageously provide optional additional security to prevent unexpected release of connected coupling means, for example, due to vibration or tampering. Preferably one or more of the additional fastening means may be releasably lockable.

The present invention provides in a further aspect a coupling system for portions of a belt for a conveyor system, the coupling system including inter-cooperating releasable coupling portions provided at respective ends of edge portions of the belt portions to be coupled, wherein the releasable coupling portions for the ends of the edge portions of one belt portion are arranged to releasably couple to the corresponding respective coupling portions for the ends of the edge portions of a second belt portion.

Preferably the belt end portions to be joined may be the two ends of a single belt. However, it will be appreciated that the belt may include two or more discrete sections, and the belt portions may be the ends of separate sections of a belt, whereby coupling of the longitudinal edge portions along the length of a belt may be provided by a multiplicity of releasable coupling portions according to one or more forms of the present invention.

A yet further aspect of the present invention provides a replaceable belt section for a conveyor system, the belt section including a portion of belt extending transversely between first and second edge members thereof, wherein each said first and second edge member includes a first and second opposed end including a coupling portion, wherein the coupling portion of each said end is arranged to releasably couple to, a corresponding respective coupling portion of another belt section.

Preferably the or each coupling portion may conform to a profile of the respective edge member, thereby advantageously alleviating risk of damage or catching when the coupling member traverses support or drive pulleys, guides or return wheels etc. Thus, when the edge member has a curved, semi circular say, upper surface, the coupling portion may have the same or similar profile.

For example, the edge member may be a hooked shape profile member such as a 'J' section hook disclosed in the applicant's international patent application published as WO 01/36303. The coupling portion may take the same profile as the 'J' section so as to avoid problems in traversing the pulleys, including engagement with the drive pulleys.

Where a corrugated belt is used, the belt sections need not be directly fastened together, rather the corrugations of one section of belt may be arranged to overly corresponding corrugations of the next section of. Thereby, the valleys of one section sit in the valleys of another section (and correspondingly the peaks of the corrugations of each section align). Weight of material of the load sitting on this overlap will assist in maintaining the join. Compaction of the material can further assist.

It will be appreciated that one or more forms of the present invention provide a major benefit to operators and users in providing a dynamic haulage system, whereby the belt of the system can be readily extended or shortened, or damaged sections replaced, with reduced downtime and loss of production associated know systems. Being able to uncouple a section or sections of belt for replacement or shortening of the system, or couple in new or additional section or sections of belt to repair or extend the belt provides a far superior system than known systems. In providing adaptability of the haulage system through a dynamic system, reduced downtime, reduced loss of revenue and lost production, reduced labour charges, as well as improved operating characteristics, provides significant advantages.

BRIEF DESCRIPTION OF THE DRAWINGS

It will be convenient to further describe the present invention with respect to the accompanying drawings which illustrate possible arrangements of the invention. Other arrangements of the invention are possible, and consequently the particularity of the accompanying drawings is not to be understood as superseding the generality of the preceding description of the invention.

DESCRIPTION OF PREFERRED EMBODIMENTS

Figure 1:
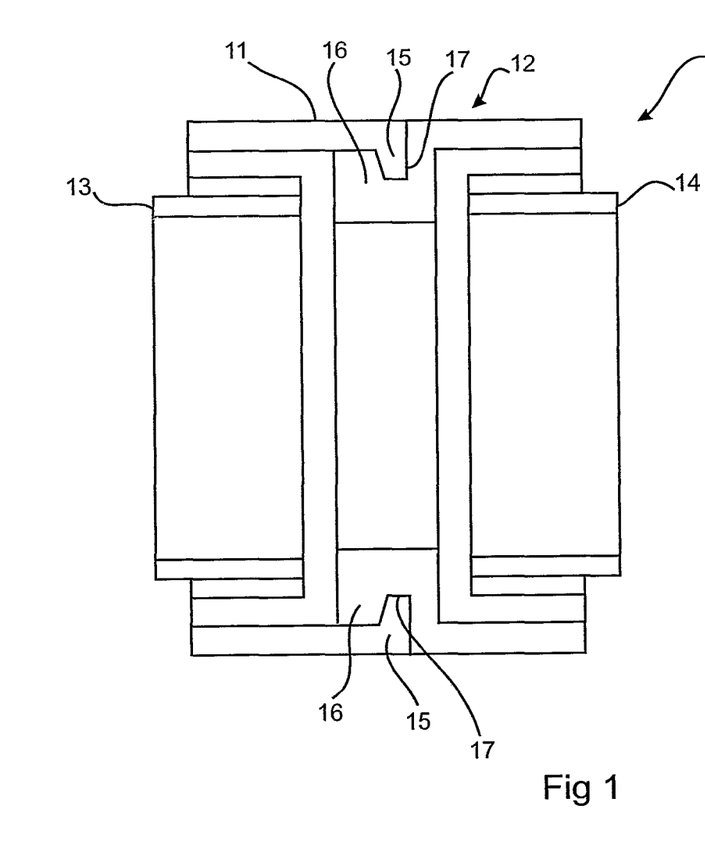
FIG. 1 is a plan view of an underside connected male and female coupling portions of the coupling device of an embodiment of the present invention.

FIG. 1 shows male 11 and female 12 coupling portions of an embodiment of the coupling device 10 according to a preferred embodiment of the present invention.

Figure 2:
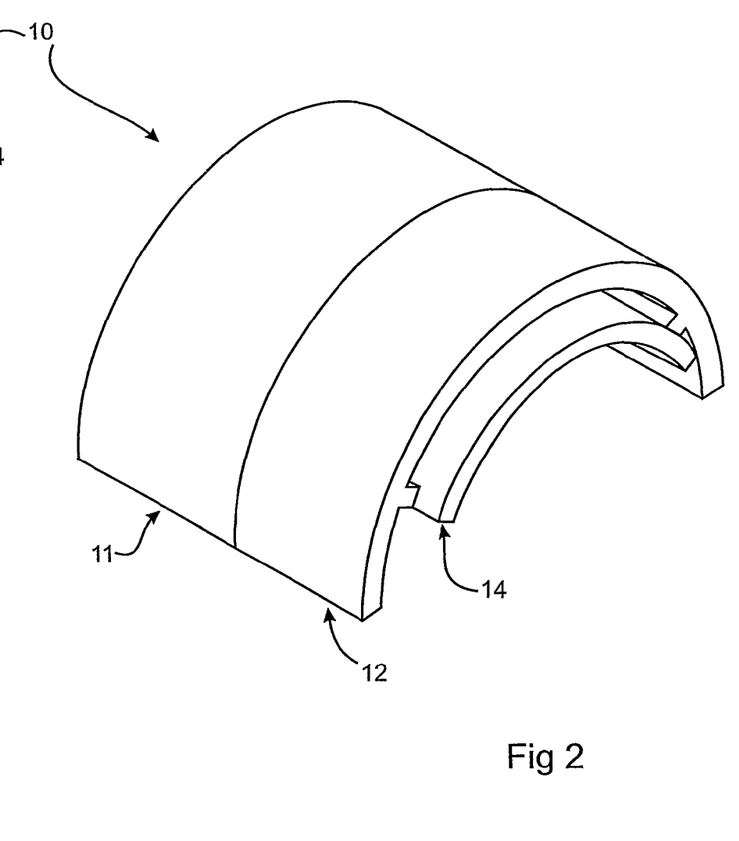
FIG. 2 is a perspective view of connected male and female coupling portions of the coupling device according to an embodiment of the present invention.

FIG. 2 shows a corresponding perspective top view of the same coupling device 10. As illustrated in FIG. 1, the male coupling portion 11 includes the raised portion 15 extending around an inner circumference of an end of the male coupling portion. This projecting portion 15 is arranged to engage with a corresponding channel 17 of the same profile provided in the female coupling portion 12. As can be seen, the profile of the protruding portion 15 and corresponding channel 17 are configured to be the same size to provide engagement which positively holds the two portions together whilst minimizing movement. This is further enhanced by a return portion 16 being provided on the female portion 12. In the embodiment shown, both the male and female portions include a bridge 13, 14, each arranged to receive a respective tension element (not shown) such as webbing, strapping, rope, cable or combinations thereof. The tension element can be attached to the bridge piece 13, 14 by various means, for example, by riveting or bolting, or the bridge piece providing an aperture through which the tension means passes and returns. In such a latter arrangement, the return portion of the tension means may be fastened to the remaining body of the tension means, for example by riveting, stitching or other bonding.

In the aforementioned arrangements, the male coupling portion is attached one end of the tension means and a female coupling portion to the other end of the tension means. In this way, tensile loads and forces exerted on one of the male of female coupling portions can be transferred through the tension means to the other of the male or female portions. The tension means can be bonded or attached to an edge member for a belt of a load haulage conveyor system. Alternatively, or in addition, the tension means can be encased within, e.g., bonded within the material of the edge member. In this way, the longitudinal edge member extending along a side of the belt does not carry tensile loads during movement of the belt in the load conveying direction, rather, the tension member transfers tensile loads and forces between coupling devices. The tension member can therefore be utilized to support the weight of the belt and the corresponding portion of the load to be carried.

Figure 3:
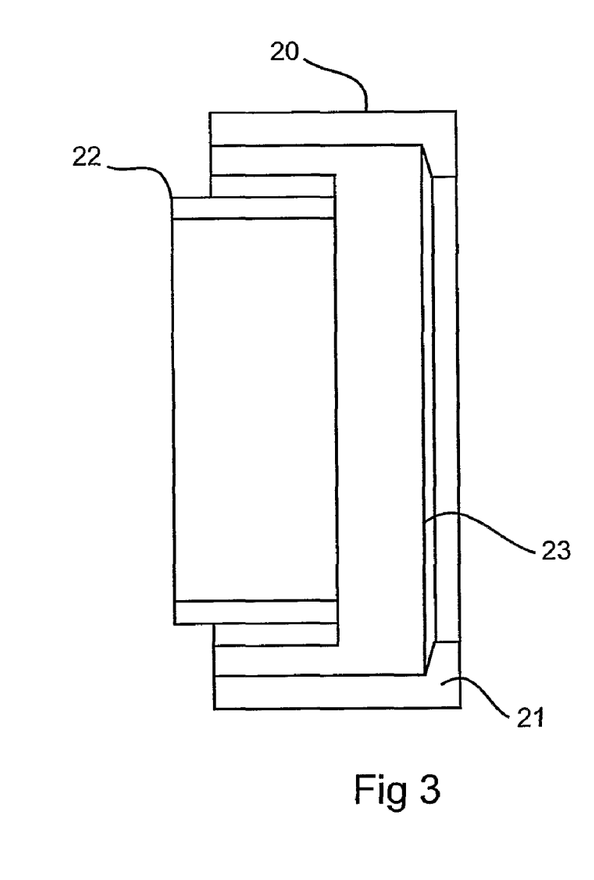
FIG. 3 is a plan view of an underside of a male coupling portion of an embodiment of the present invention.
Figure 4:
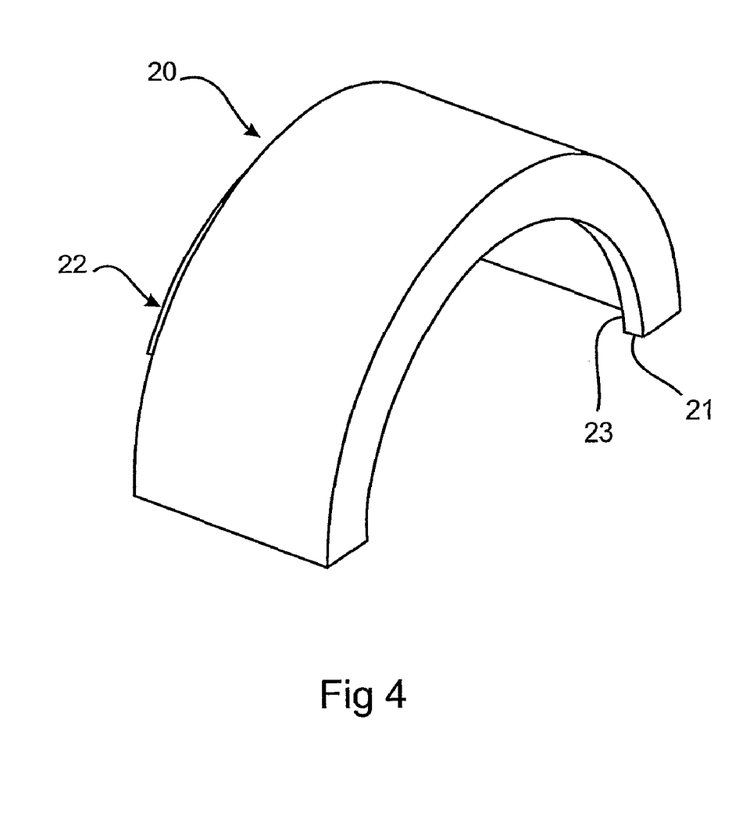
FIG. 4 is a perspective view of the male coupling portion of FIG. 3.

FIG. 3 shows a plan view of a male coupling portion 20 and FIG. 4 shows a perspective view of the same. The inner-circumferential projecting ridge 21 can be seen, as well as the portion 22 for connecting the male coupling portion 20 to a tension means. The projecting ridge 21 includes a bevelled face 23 which is arranged to engage with a corresponding face on the respective female coupling portion.

It will be appreciated that the projecting ridge 21 and bevelled face 23 assist in forming a firm and strong engagement between the male and female coupling portions so that the resulting coupling device remains rigid.

According to a preferred embodiment, the respective lengths of the male and female portions would ideally be kept relatively short in the longitudinal direction to assist in the coupling device traversing return wheels, drive and pulley wheels. In such arrangements, the coupling device may be formed of metal, such as high tensile steel. However, it would further be appreciated that the coupling device may be formed of other materials, such as, high strength plastics or combinations of plastics and metals. Where the coupling device has flexural properties, the longitudinal length of the coupling device may extend a reasonable amount provided the coupling device is able to traverse return wheels and pulley/drive wheels for a particular application.

Figure 5:
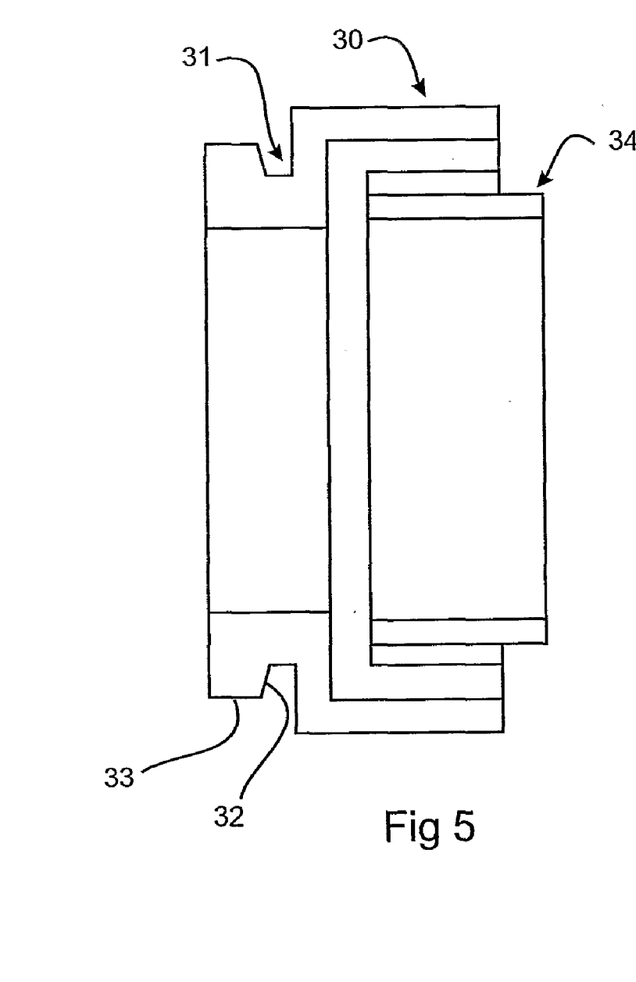
FIG. 5 is an underside plan view of a female coupling portion of a coupling device according to an embodiment of the present invention.
Figure 6:
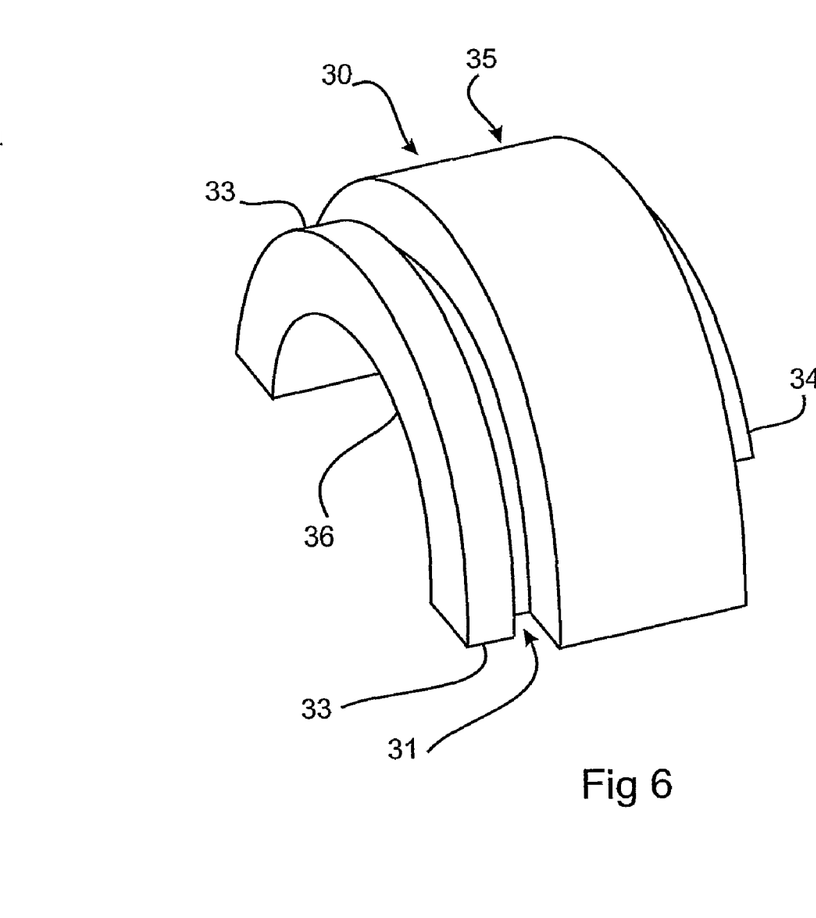
FIG. 6 is a perspective view of the female coupling portion of FIG. 5.

FIG. 5 shows a corresponding female coupling portion 30 which is configured to engage with the male coupling portion 20 shown in FIGS. 3 and 4. Referring to FIG. 5 in particular, the female coupling portion 30 shows the groove or channel 31 for receiving the projecting ridge of the corresponding male portion. Where the male portion has a profiled face, the female portion includes a corresponding profiled face 32. The groove or channel 31 and profiled face 32 act to receive and positively engage with the corresponding ridge and face of the male coupling portion to rigidly hold the two portions together. This arrangement is further strengthened by the projecting portion 33 providing strength and assisting in tensile loads through the coupling device. A portion 34 is shown for connecting or retaining a respective tension member (not shown).

It will be appreciated that the external and/or internal profiles of the respective male and female coupling portions can be configured such that they avoid or alleviate problems in allowing the longitudinal edge members and coupling devices to readily traverse pulleys and drive wheels etc. For example, the curved outer and inner profiles of the male and female coupling portions can be arranged to conform to the curvature of pulley wheels and/or also conform to the profile of the longitudinal edge member or "J" section of the Applicant's corresponding International patent application WO 01/36303.

Figure 7:
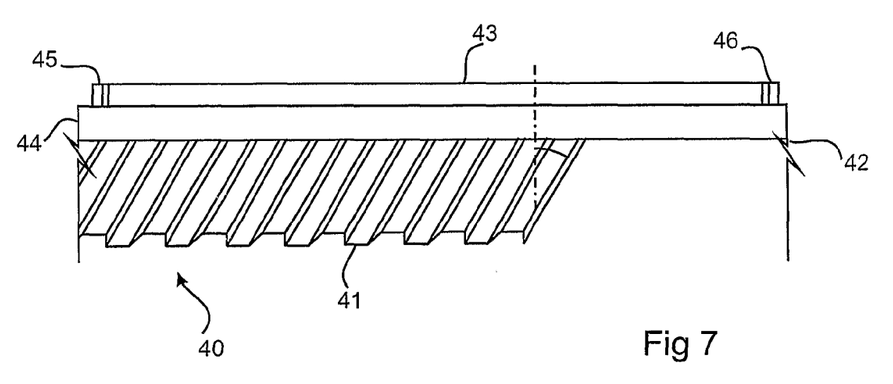
FIG. 7 shows a section of a belt for a conveyor system incorporating an embodiment of the present invention.

FIG. 7 shows an example of a corrugated belt section 40. In this example the corrugations 41 are directed at an angle to the axis of the belt 40. The corrugations in this example extend only partially up the side of the belt to a line 42. This line 42 may vary with conditions, materials, moisture content, inclination etc. The top edge of the belt 40 incorporates a longitudinal edge member 43. For example, the longitudinal edge member 43 may be a J or hook section located along each of the longitudinal edges of the strip 44 of the belt 40. The J or hook sections 43 comprise, in this embodiment, shaped metal elements to form the hook shape, and reinforced by a plurality of steel cables, or other composite constructions, running longitudinally and parallel with the strip 44. The J or hook sections may be integrally connected to the strip to form part of the belt.

Respective ends of the J or hook section include corresponding male 45 and female 46 coupling portions. The male coupling portion 45 is arranged to connect to a corresponding female portion of a next adjacent portion of belt, and the female portion 46 is arranged to connect to a corresponding male portion of a next consecutive portion of belt.

Figure 8:
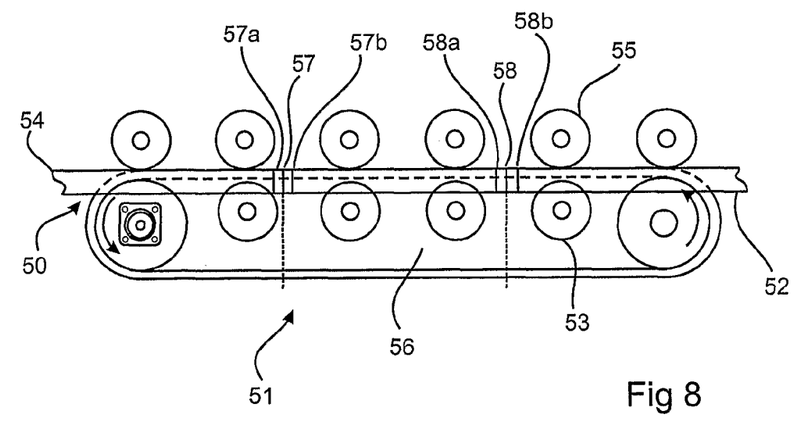
FIG. 8 shows a section of a conveyor system incorporating a section of belt including an embodiment of the present invention.
Figure 9A:
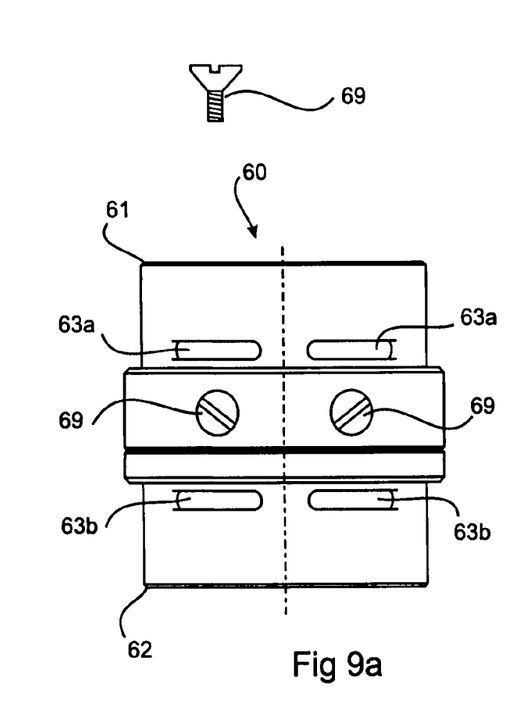
FIGS. 9a-9d show views of an alternative form of a connector according to a further embodiment of the present invention.
Figure 9B:
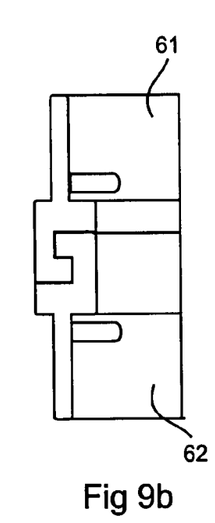
Figure 9C:
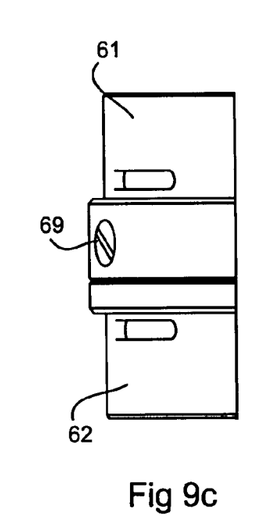
Figure 9D:
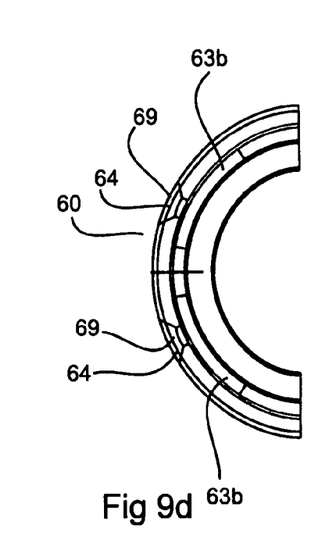

FIG. 8 shows a section of a conveyor system including the belt 50 being driven by a caterpillar drive 51, which includes a continuous belt 52 travelling around a series of idlers 53. The hook section 54 of the belt 50 is driven by being threaded between a series of pinch idlers 55 and the caterpillar drive system. Thus, drive along the continuous belt 52 is assisted by the adjustable pressure applied between the pinch idlers 55 and the caterpillar idlers 53.

Hence, whilst the drive 51 may be based on friction, the reaction pressure which controls the friction drive is adjustable under adverse conditions. Alternative forms of drive are also envisaged, such as sprocket or chain drive. A section of belt 56 is shown. Respective coupling devices 57, 58 are shown at ends thereof. Each coupling device 57, 58 include male and female coupling portions 57a, 57b and 58a, 58b. For example, the male coupling portion 57a of one section of the belt connects to the female coupling portion 57b of the identified section of belt 56. A corresponding male coupling portion 58a of the identified section of belt 56 connects to the corresponding female coupling portion 58b of the next consecutive section of belt. In this way, should the identified section of belt 56 need replacing due to damage or wear, the male and female coupling portions 57a, 57b and 58a, 58b can be separated at each side of the belt and the relative section removed and replaced. Replacement can be effected by a reversal of the removal procedure. Consequently, down time of the conveying system is reduced with a corresponding reduction in loss of production and associated costs.

Figure 10A:
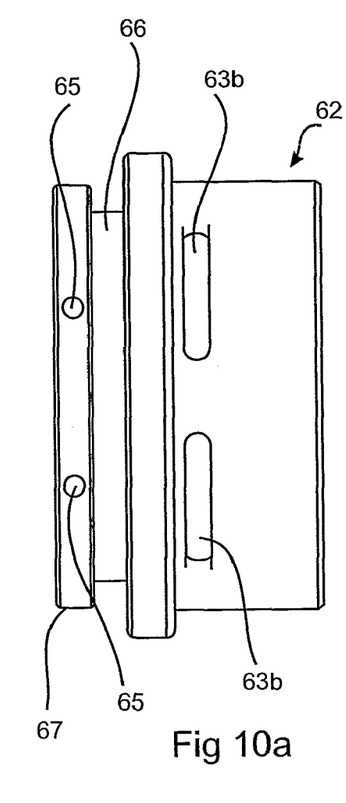
FIG. 10a-10c show views of a female portion of the connector according to FIGS. 9a-9d.
Figure 10B:
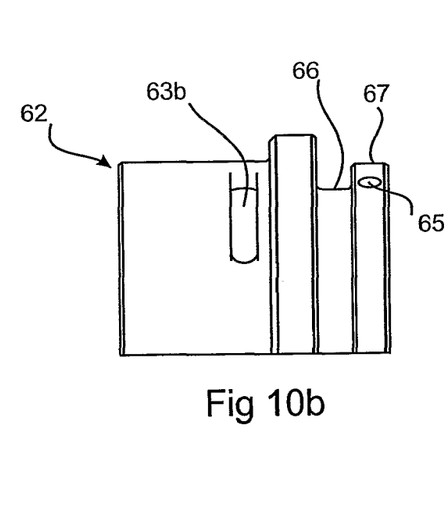
Figure 10C:
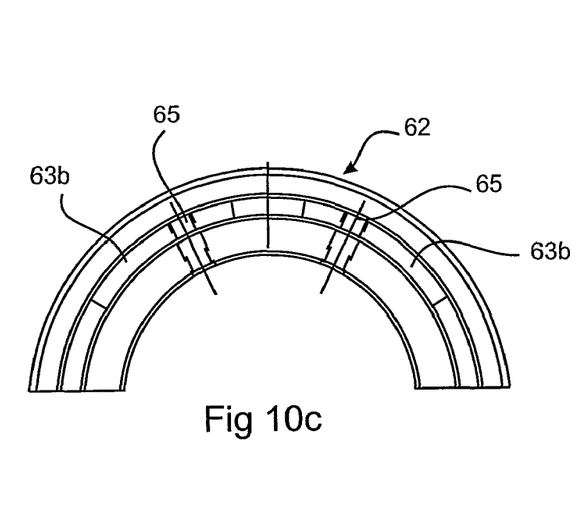
Figure 11A:
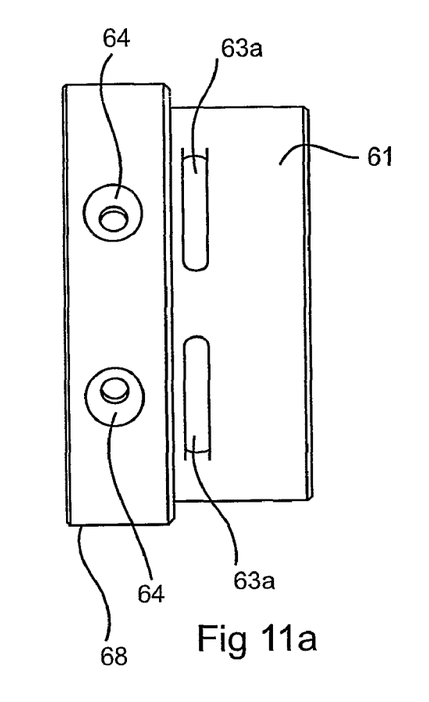
FIGS. 11a-11c show views of a male portion of the connector according to FIGS. 9a-9d.
Figure 11B:
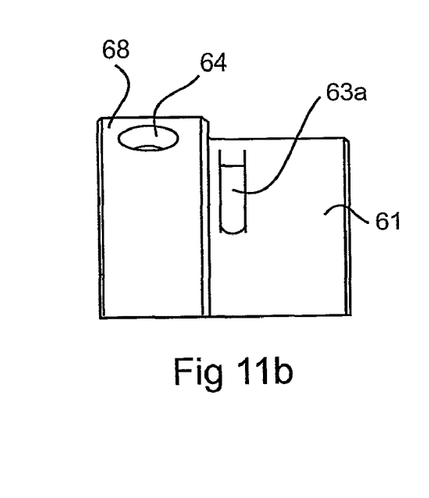
Figure 11C:
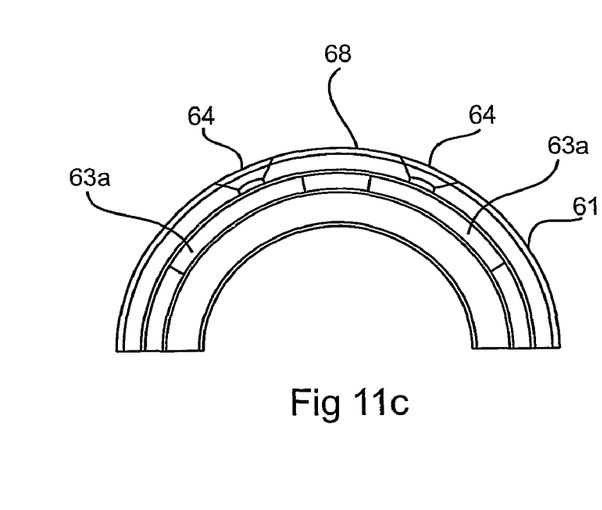

FIGS. 9a to 9d show an alternative embodiment of the connector. The connector 60 body includes two portions, a male portion 61 and a female portion 62. The male portion has a flange depending from a body part 68, which is received into a recess 66 positioned adjacent a corresponding flange 67 of the female portion when coupled (FIGS. 10a-10c). Either or both of the male and female portions may include a body part with one or more apertures 63a, 63b for receiving therethrough at least a portion of a load transmitting means, such as a webbing member. For example, male and female portions in this embodiment each include two apertures 63a and 63b. An end of the load transmitting means is passed through the apertures, and then fastened back onto itself, such as by stitching, adhesive, riveting or other fastening means, or may be moulded into a synthetic or natural material of the belt or a belt edging member, such as a belt driving edge member or J section. This at least one aperture through the body portion provides additional strength and tension resistance advantages compared with the aforementioned embodiment shown in FIG. 2, e.g. member 14. The aperture(s) through the body portion provides greater strength for applied tensile forces in allowing a greater amount of material of the connector member to surround the aperture(s) compared with the member 14 which defines a slot. Countersunk apertures 64 are provided on the male portion 61 to receive therethrough countersunk fasteners 69, such as countersunk screws, to fasten into corresponding threaded apertures 65 on the female portion 62 (see FIGS. 10a to 10c). These fasteners 69 are arranged to hold the two halves of the connector together.

FIGS. 10a to 10c, and 11a to 11c reveal the respective male and female portions of the connector. The male portion 61 includes countersunk apertures 64 for receiving retaining screws or grub screws 69 to hold the two parts together, whilst the female portion 62 includes the corresponding threaded receiving holes 65 therefor. Whilst the male—female interconnection connects the two parts together, it will be appreciated that the fastening means 69, such as grub screws etc, help to retain the two parts together during movement, vibration and change of direction of the belt whilst allowing release of the two parts when needed eg for maintenance or replacement.

It will be understood that the coupling system or belt section according to a variety of embodiments of the present invention allow a conveyor belt to be replaced, repaired, extended or shortened more easily, efficiently and cost effectively than known systems for disconnecting belts. Also, the coupling devices help to transfer tensile loads and forces along the edge sections of the belt, thereby avoiding tensile loads being applied to the belt material directly. This can be achieved by having the respective coupling portions eg male and female portions connected together via a tension means, such as a strap, webbing, rope etc.

Whilst the present invention has been described with reference to one or more particular embodiments, such embodiments are not, and should not, be taken to limit the invention, and other embodiments are taken to fall within the spirit and scope of the invention.

The invention claimed is:

1. A coupling device for use in connecting together corresponding ends of a conveyor belt, the conveyor belt having opposed longitudinally extending side edge parts, the coupling device releasably fastening together end portions of said longitudinally extending side edge parts,
    the coupling device including at least first and second coupling portions,
    the first coupling portion being provided for a respective first end of a first said edge part of a portion of the belt and
    the second coupling portion being provided for a respective second end of a second said edge part of a further portion of the belt,
    the first and second ends being connected by the first and second coupling portions on the same side of the belt, and wherein the first and second coupling portions each has an engagement portion configured for co-operative engagement to releasably fasten together to connect longitudinally one end of a portion of the belt to another, the first and second coupling portions being attached to a respective tension means to transfer tensile forces through the belt edge part on said one side of the belt, and wherein the first and second coupling portions have respective curved profiles conforming to a curved profile of the opposed longitudinal side edge parts of the belt, the opposed longitudinal side edge parts for use in supporting the belt between support means.

2. A coupling device as claimed in claim 1, wherein the edge parts are longitudinal edge portions integral to or attached to the belt.

3. A coupling device as claimed in claim 1, wherein the edge portions are formed of or include hook or "J" section means to support the body of the belt from a roller and/or pulley drive system.

4. A coupling device as claimed in claim 1, wherein the first or second coupling portions include means for retaining at least one tension means.

5. A coupling device as claimed in claim 1, wherein the at least first and second coupling portions are corresponding male and female connectors.

6. A coupling device as claimed in claim 1, wherein the means for retaining the tension means includes a bridge such that an end of the tension means is passed over and around the bridge and fastened back on itself or to the bridge.

7. A coupling device as claimed in claim 2, wherein the means for retaining the tension means includes at least one aperture such that an end of the tension means is passed through the at least one aperture and fastened back on itself or to the bridge.

8. A coupling device as claimed in claim 1, wherein the tension means includes a longitudinal strap, webbing, rope, cable, belt or combinations thereof.

9. A coupling device as claimed in claim 8, wherein the tension means is molded into or integral with the respective side edge.

10. A coupling device as claimed in claim 1, further including at least one additional releasable fastening means for releasably connecting together the at least first and second coupling portions.

11. A coupling device as claimed in claim 10, wherein the at least one additional releasable fastening means is one or more screws, bolts, pins or circlips.

12. A coupling device as claimed in claim 10, wherein one or more of the additional fastening means is/are releasably lockable.

13. A coupling device as claimed in claim 1, a said coupling device provided at each of the two longitudinal sides of the belt and joining the belt end sections together longitudinally.

14. A coupling system for portions of a belt for a conveyor system, the coupling system including at least one coupling device having first and second inter-cooperating releasable coupling portions provided at respective ends of longitudinally extending edge portions of the belt portions to be coupled, the respective end portions being on the same side of the belt, and wherein the releasable first and second coupling portions for the ends of the edge portions of one belt portion each has an engagement portion attached to tension means and configured for co-operative engagement to releasably couple to the corresponding respective second and first coupling portions for the ends of the edge portions of a second belt portion to connect longitudinally the one belt portion to the second belt portion, and wherein the first and second coupling portions have respective curved profiles conforming to a curved profile of the opposed longitudinal side edge parts of the belt, the opposed longitudinal side edge parts for use in supporting the belt between support means.

15. A coupling system as claimed in claim 14, wherein the belt end portions are two ends of a single belt.

16. A coupling system as claimed in claim 14, wherein the belt includes two or more discrete sections, and the belt portions are the ends of separate sections of a belt, whereby coupling of the edge portions along the length of a belt is provided by a multiplicity of releasable coupling portions.

17. A belt section for a conveyor system, the belt section including a portion of belt extending transversely between first and second longitudinally extending side edge members thereof, wherein each said first and second edge member includes a first and second opposed end each including a first coupling portion of a coupling device according to claim 1, wherein the first coupling portion of each said end is arranged to releasably couple to a corresponding respective second coupling portion of another belt section to connect longitudinally the one belt section to the other belt section, the first and second coupling portions being attached to respective tension means arranged to transfer tensile forces through the belt edge members.

18. A belt section for a conveyor system as claimed in claim 15, wherein the coupling portions conform to a profile of the respective edge member.

* * * * *